United States Patent
Moniz et al.

(10) Patent No.: US 10,446,147 B1
(45) Date of Patent: Oct. 15, 2019

(54) CONTEXTUAL VOICE USER INTERFACE

(71) Applicant: Amazon Technologies, Inc., Seattle, WA (US)

(72) Inventors: Michael James Moniz, Seattle, WA (US); Abishek Ravi, Seattle, WA (US); Ryan Scott Aldrich, Seattle, WA (US); Michael Bennett Adams, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/634,780

(22) Filed: Jun. 27, 2017

(51) Int. Cl.
*G10L 15/22* (2006.01)
*G10L 15/06* (2013.01)
*G10L 15/26* (2006.01)
*G06F 17/27* (2006.01)

(52) U.S. Cl.
CPC .......... *G10L 15/22* (2013.01); *G06F 17/2785* (2013.01); *G10L 15/063* (2013.01); *G10L 15/265* (2013.01); *G10L 2015/223* (2013.01)

(58) Field of Classification Search
CPC .............................. G10L 15/22; G10L 15/063
See application file for complete search history.

(56) References Cited

U.S. PATENT DOCUMENTS

| | | | |
|---|---|---|---|
| 8,930,881 B1* | 1/2015 | Eddins | G06F 8/22 717/100 |
| 9,190,054 B1* | 11/2015 | Riley | G10L 25/48 |
| 9,224,387 B1* | 12/2015 | Slifka | G10L 15/00 |
| 2006/0020464 A1* | 1/2006 | Ju | G10L 15/08 704/257 |
| 2009/0150156 A1* | 6/2009 | Kennewick | G06Q 30/0261 704/257 |
| 2009/0313016 A1* | 12/2009 | Cevik | G10L 15/22 704/241 |
| 2016/0365088 A1* | 12/2016 | Liang | G06F 3/04842 |
| 2017/0263249 A1* | 9/2017 | Akbacak | G10L 15/08 |

* cited by examiner

*Primary Examiner* — Paras D Shah
*Assistant Examiner* — Bryan S Blankenagel
(74) *Attorney, Agent, or Firm* — Pierce Atwood LLP

(57) ABSTRACT

Techniques for providing a contextual voice user interface that enables a user to query a speech processing system with respect to the decisions made to answer the user's command are described. The speech processing system may store speech processing pipeline data used to process a command. At some point after the system outputs content deemed responsive to the command, a user may speak an utterance corresponding to an inquiry with respect to the processing performed to respond to the command. For example, the user may state "why did you tell me that?" In response thereto, the speech processing system may determine the stored speech processing pipeline data used to respond to the command, and may generate output audio data that describes the data and computing decisions involved in determining the content deemed responsive to the command.

20 Claims, 18 Drawing Sheets

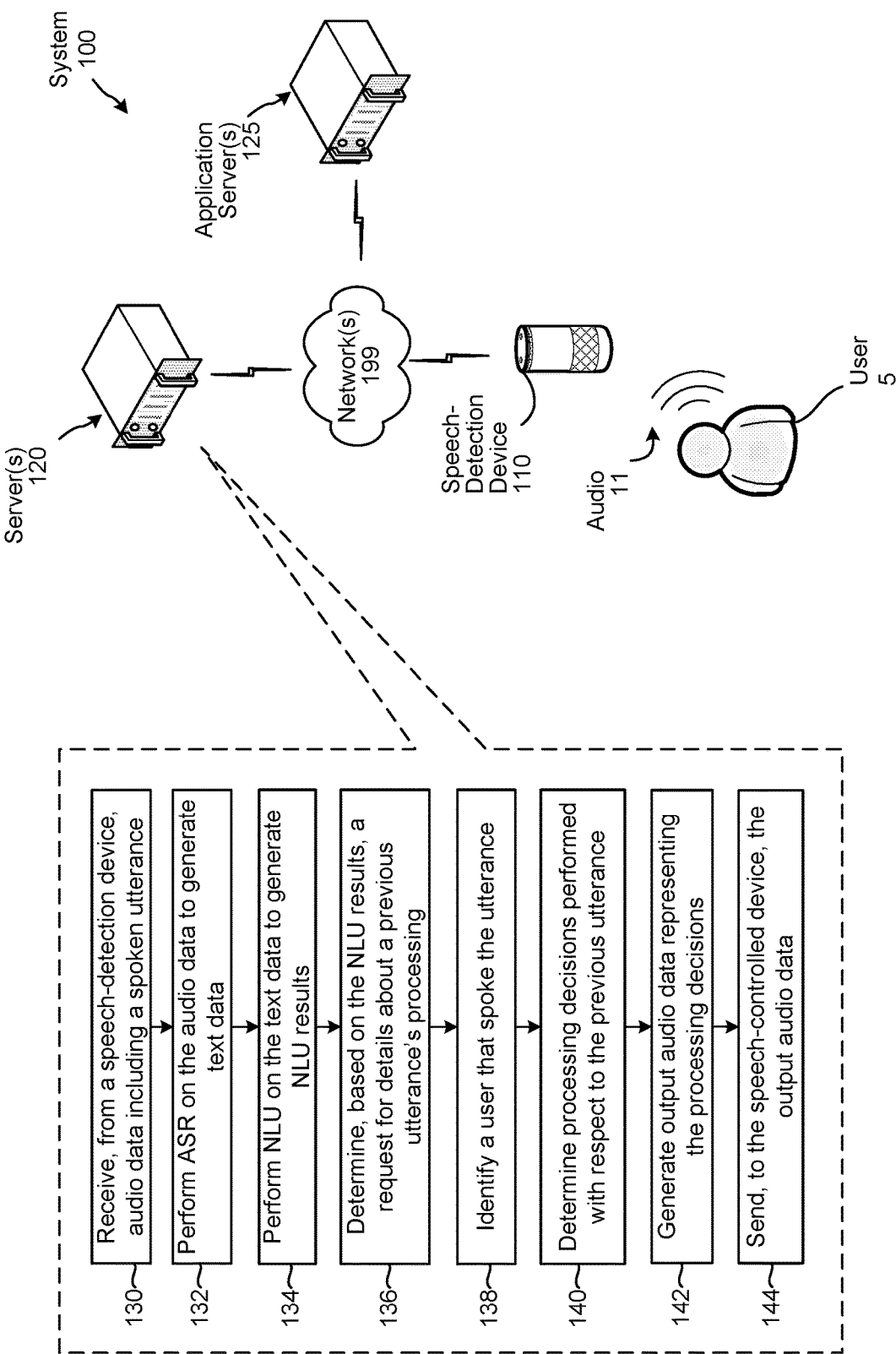

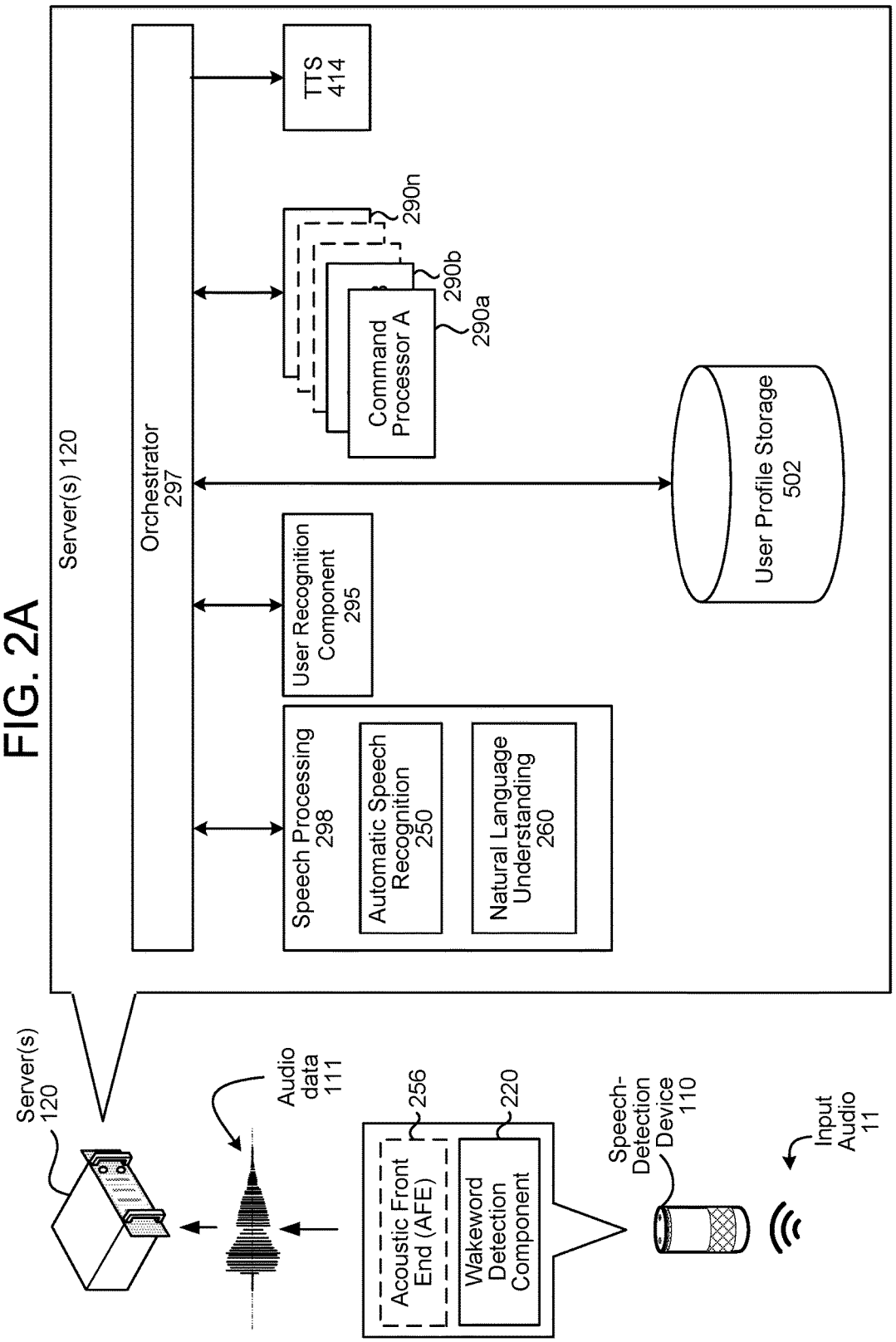

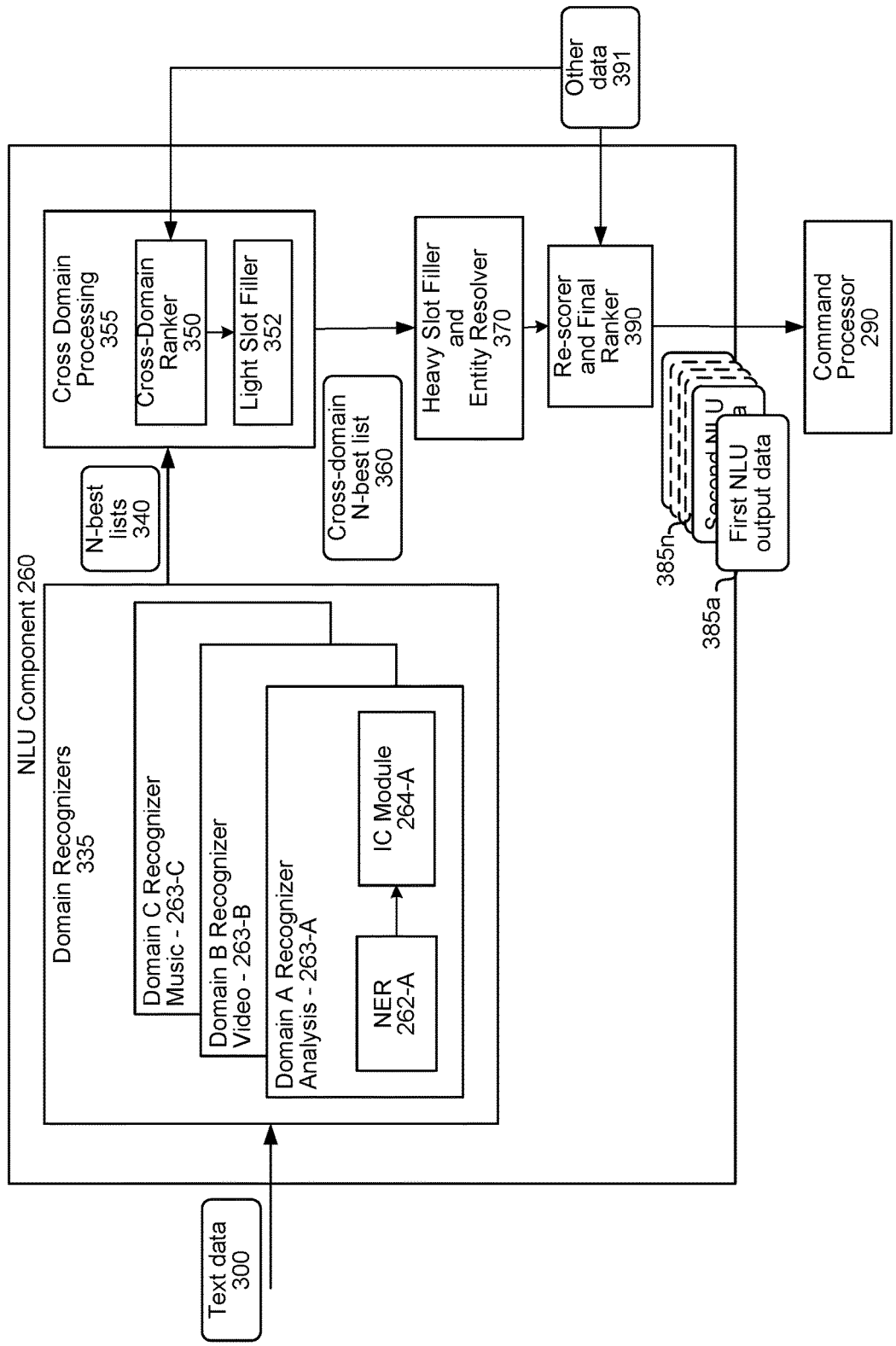

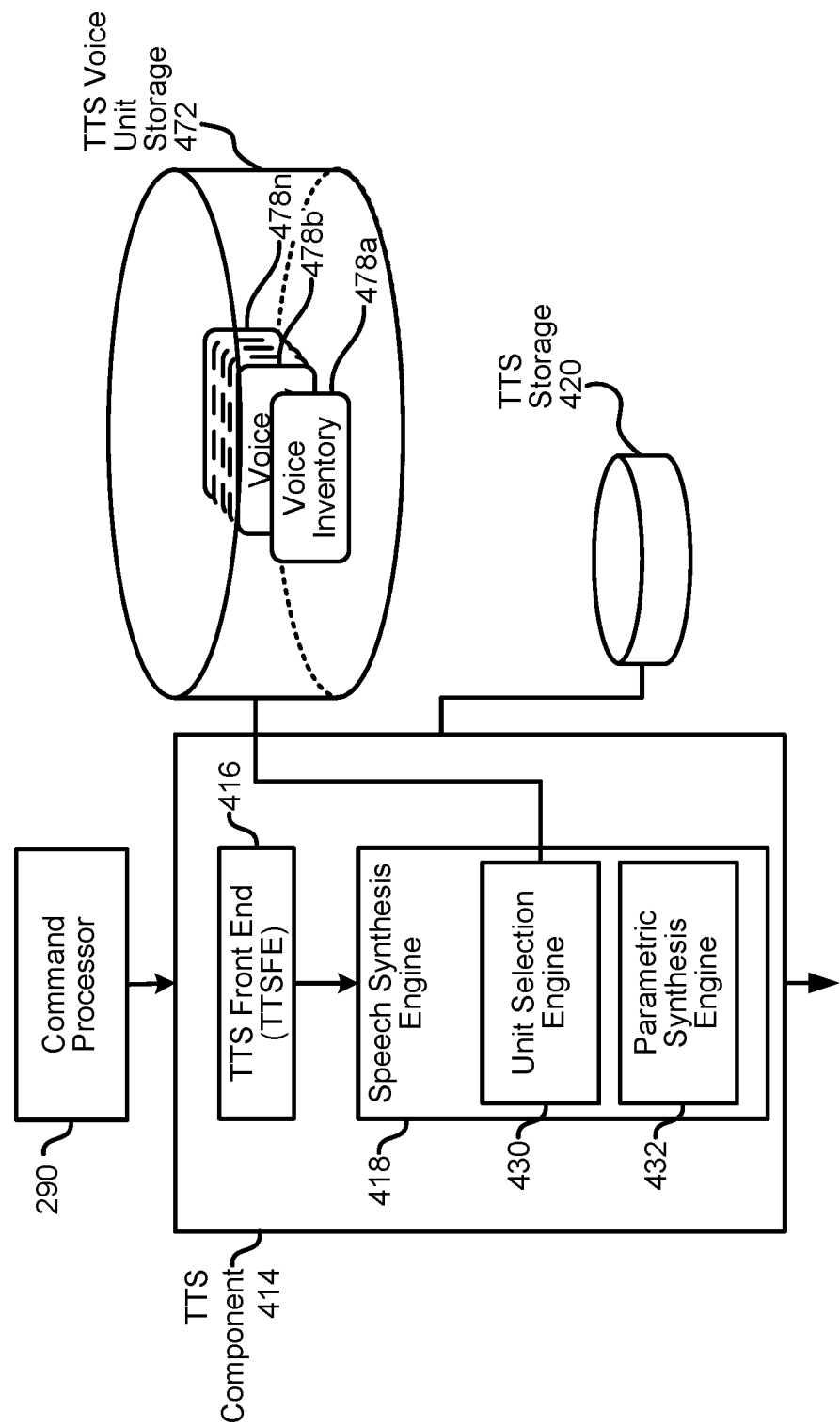

FIG. 6

| Session ID | ASR Output | NLU Output Intent | NLU Framework Slots | API Invoked | Context Data |
|---|---|---|---|---|---|
| 12345 | What is the weather | Output weather | <temperature: Seattle, Washington> | Weather service | Location: Seattle, Washington Input audio data timestamp: May 8, 10:00 a.m. |
| 12346 | Play adele's water under the bridge | Play music | <artist: Adele>; <song title: water under the bridge> | Music service | Input audio data timestamp: May 8, 10:02 a.m. User ID linked to session ID |
| 12347 | Play animal house | Play movie | <title: animal house> | Movie service | Input audio data timestamp: May 8, 11:13 a.m. User ID linked to session ID |
| 12348 | Buy candles | Buy product | <product: candles> | Electronic marketplace | Input audio data timestamp: May 8, 11:42 a.m. User ID linked to session ID |

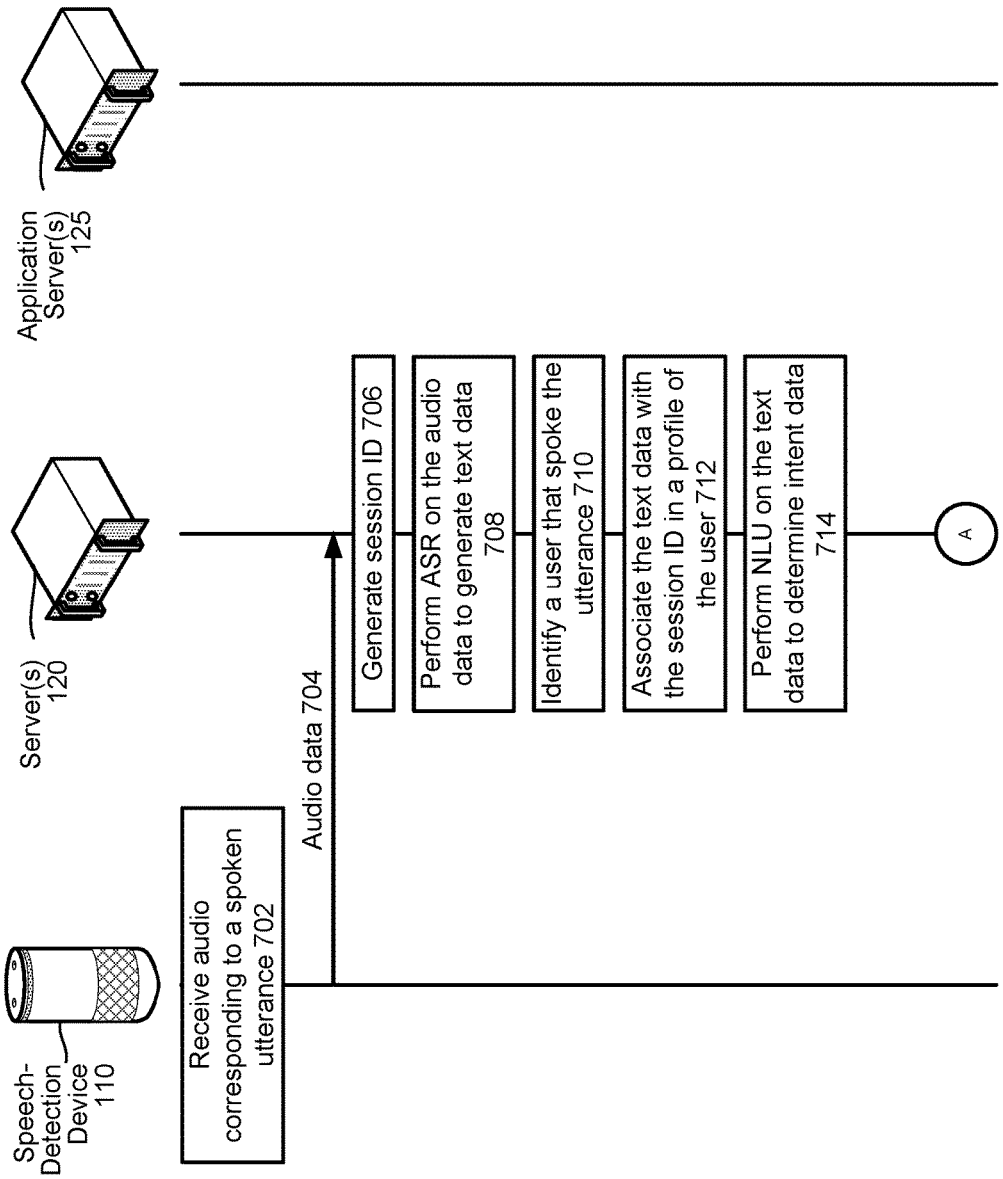

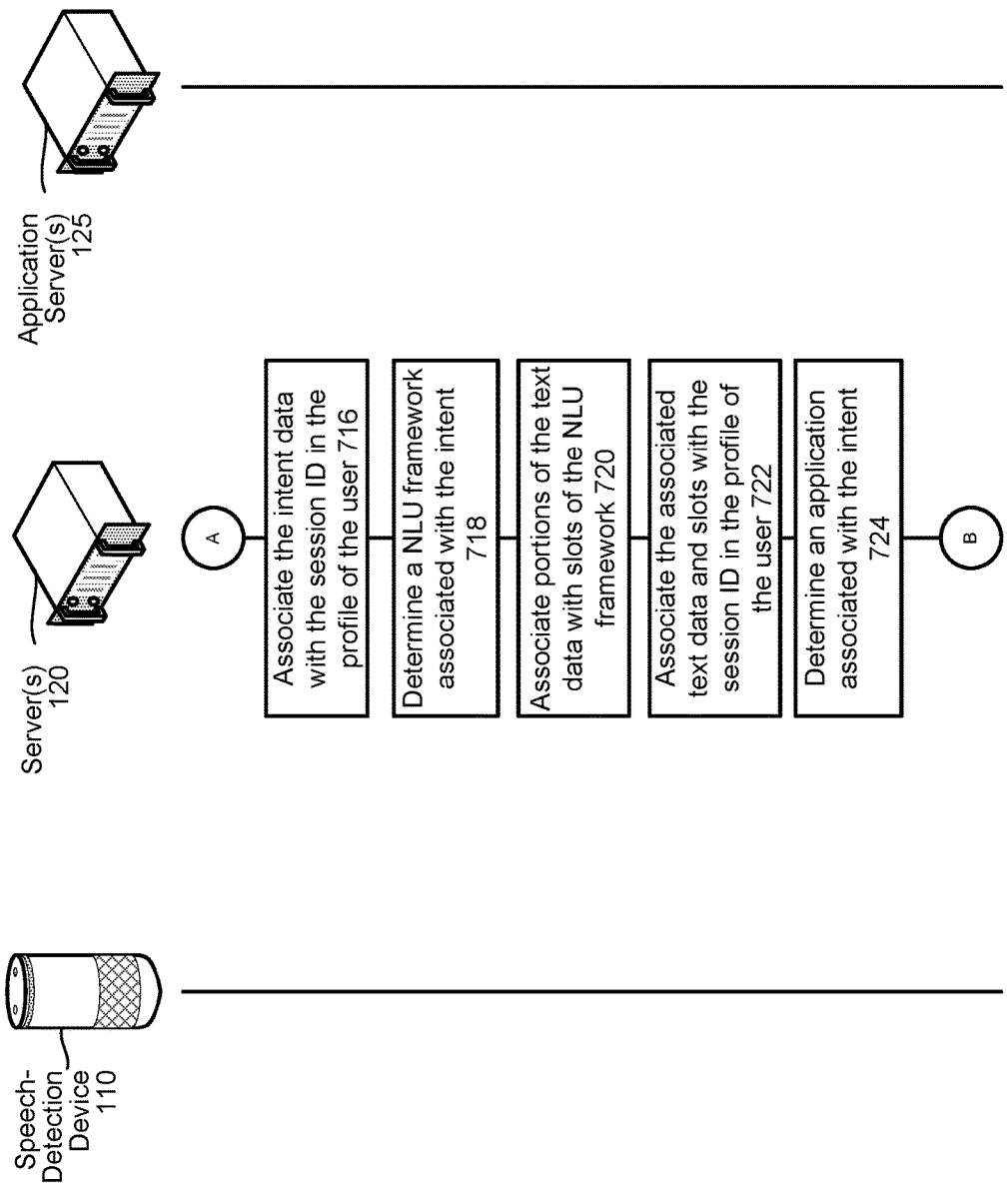

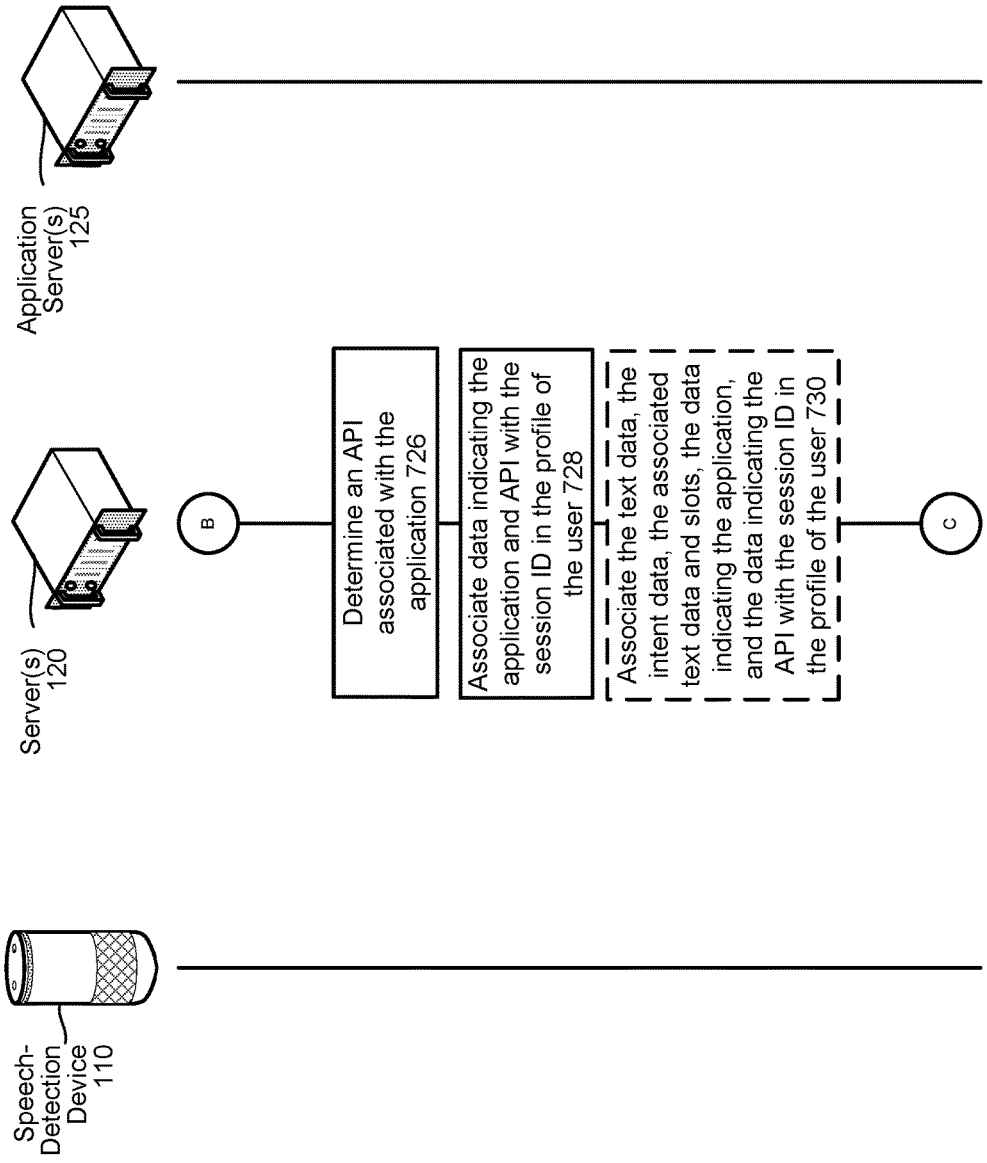

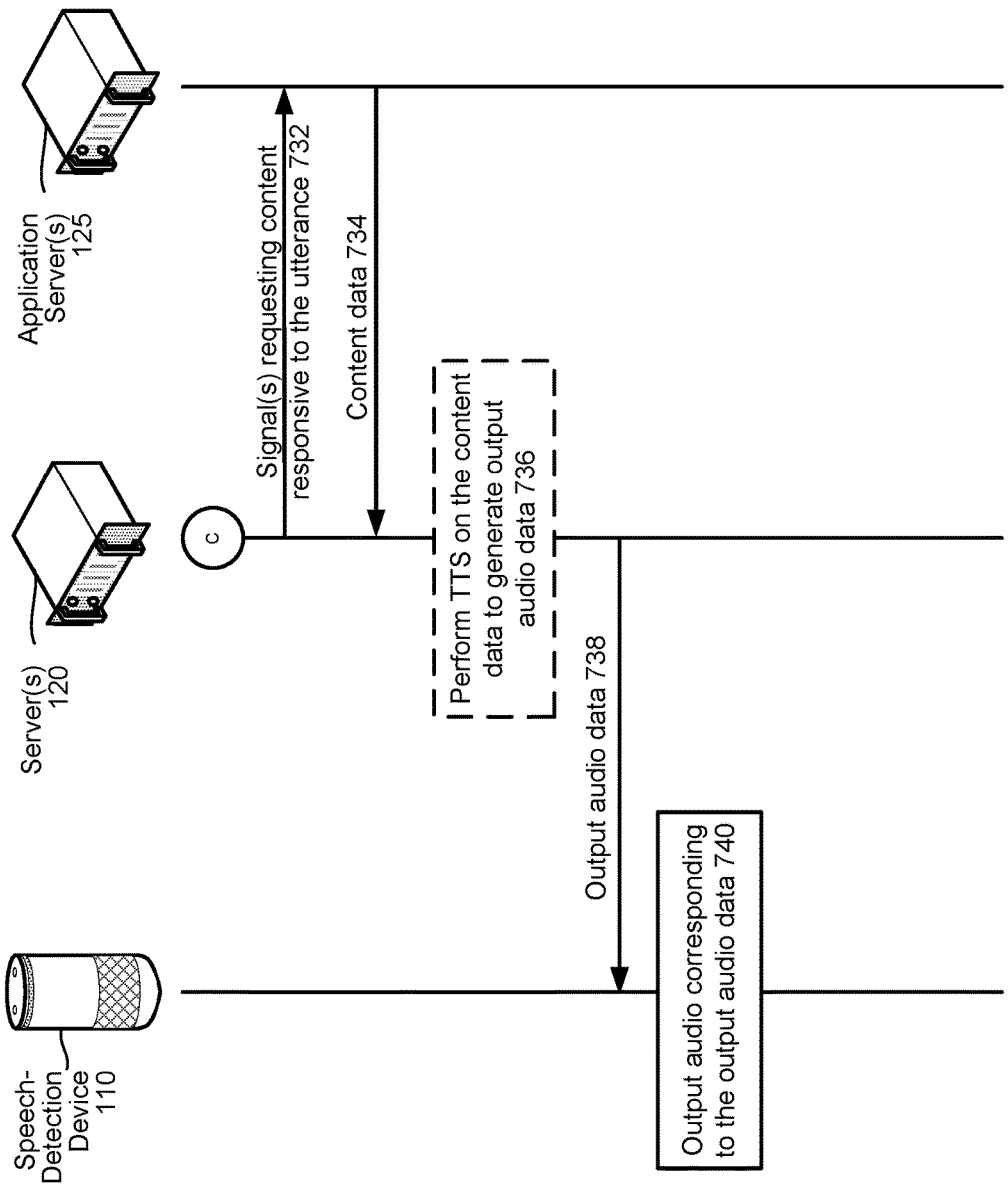

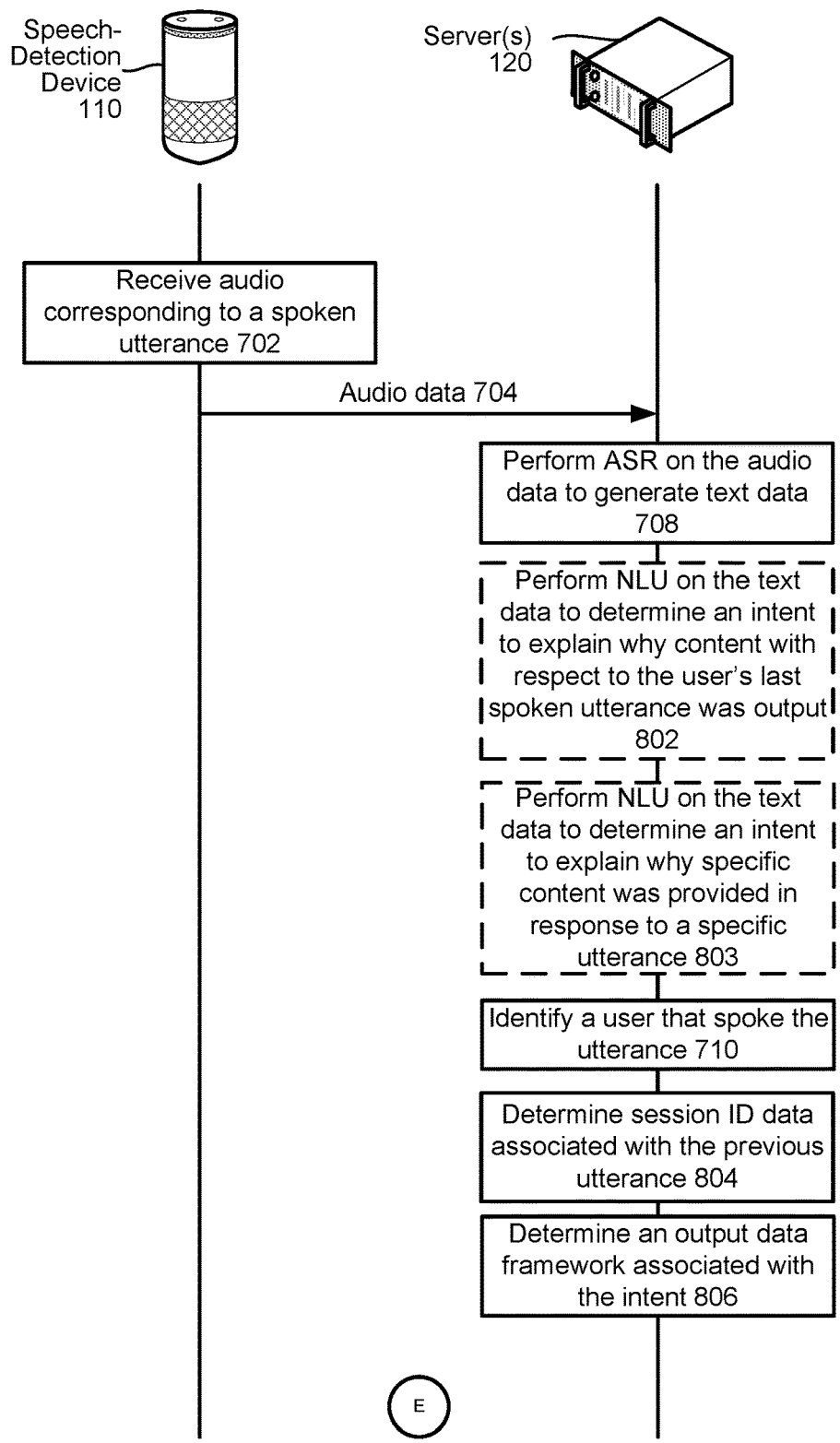

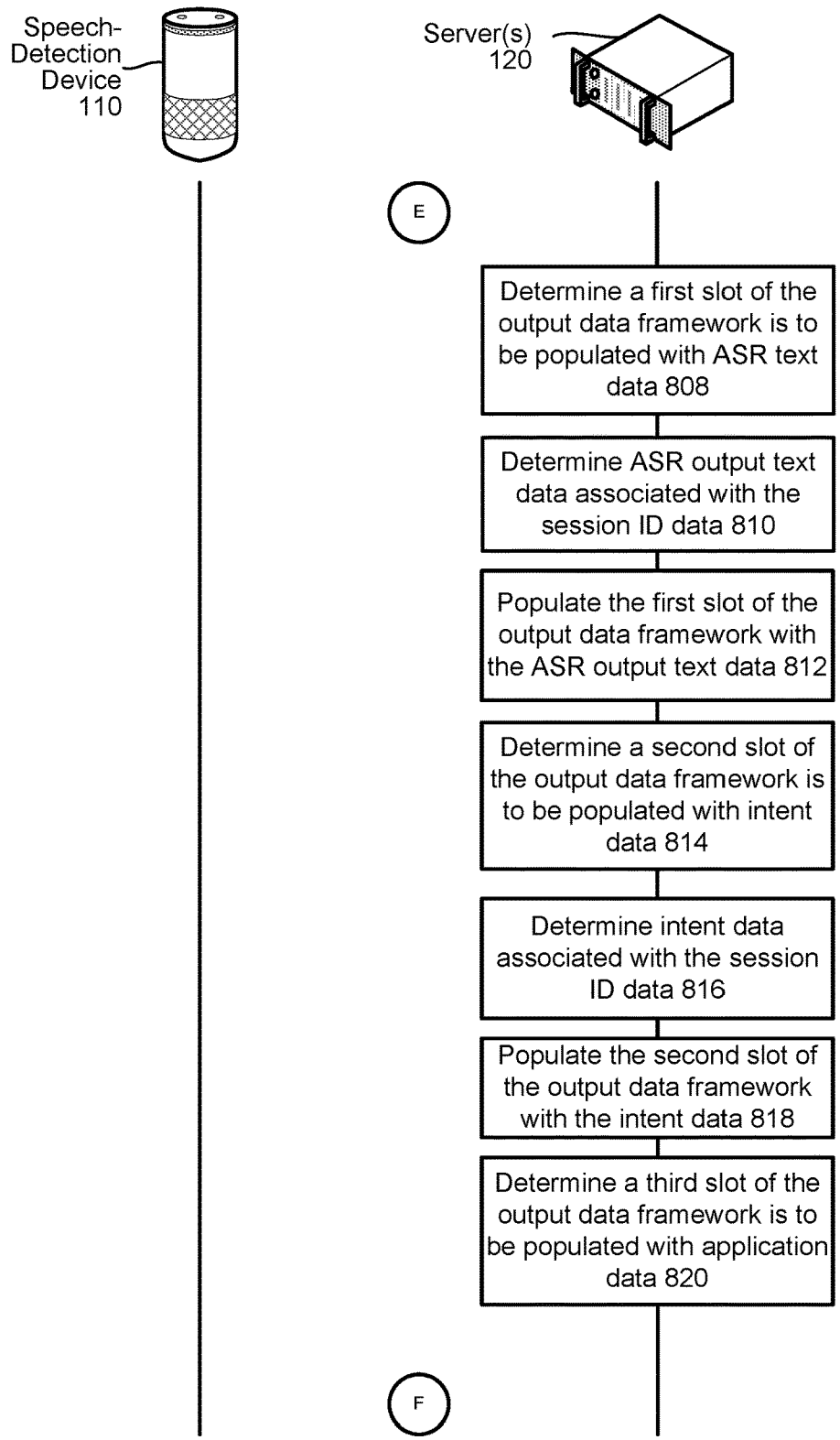

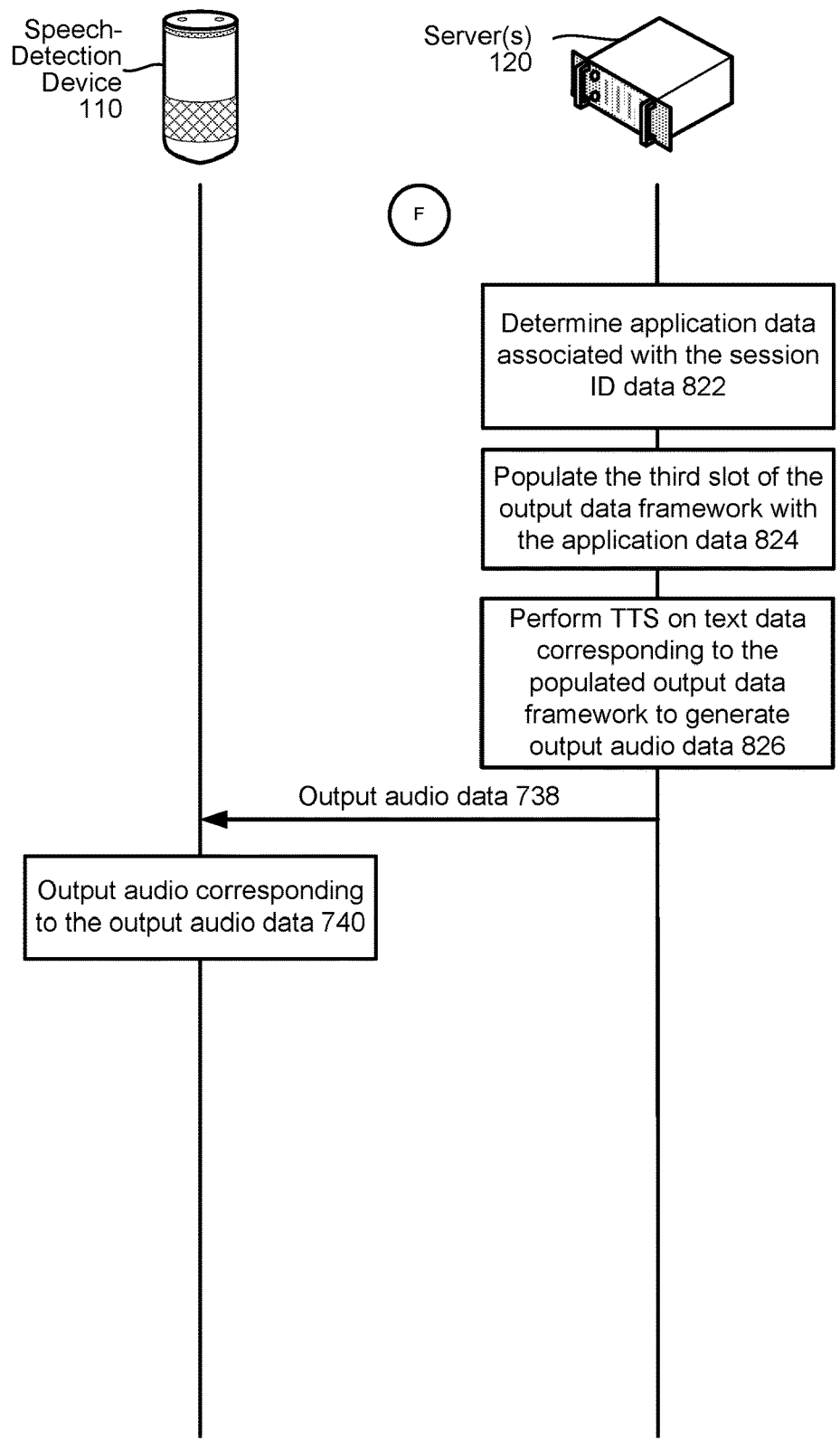

FIG. 9

"I output <content> because you said <ASR output text data> and I interpreted <first portion of ASR output text data> as <NLU intent> and <second portion of ASR output text data> as <NLU slot associated with second portion of ASR output text data>. I retrieved the <content> from <application>."

CONTEXTUAL VOICE USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a speech processing system configured to provide a contextual voice user interface according to embodiments of the present disclosure.

FIG. 2A is a diagram of components of a speech processing system according to embodiments of the present disclosure.

FIG. 3 is a conceptual diagram of a system architecture for parsing incoming utterances using multiple domains according to embodiments of the present disclosure.

FIG. 4 is a conceptual diagram of how text-to-speech processing is performed according to embodiments of the present disclosure.

FIG. 6 illustrates speech processing pipeline data associated with a session ID according to embodiments of the present disclosure.

FIGS. 7A through 7D are a signal flow diagram illustrating the processing of as utterance and the generation of a session record according to embodiments of the present disclosure.

FIGS. 8A through 8C are a signal flow diagram illustrating the processing of an utterance referencing either an immediately preceding processed utterance or a non-immediately preceding processing utterance according to embodiments of the present disclosure.

FIG. 9 illustrates a data output format usable to output data to a user according to embodiments of the present disclosure.

DETAILED DESCRIPTION

Figure 2B:
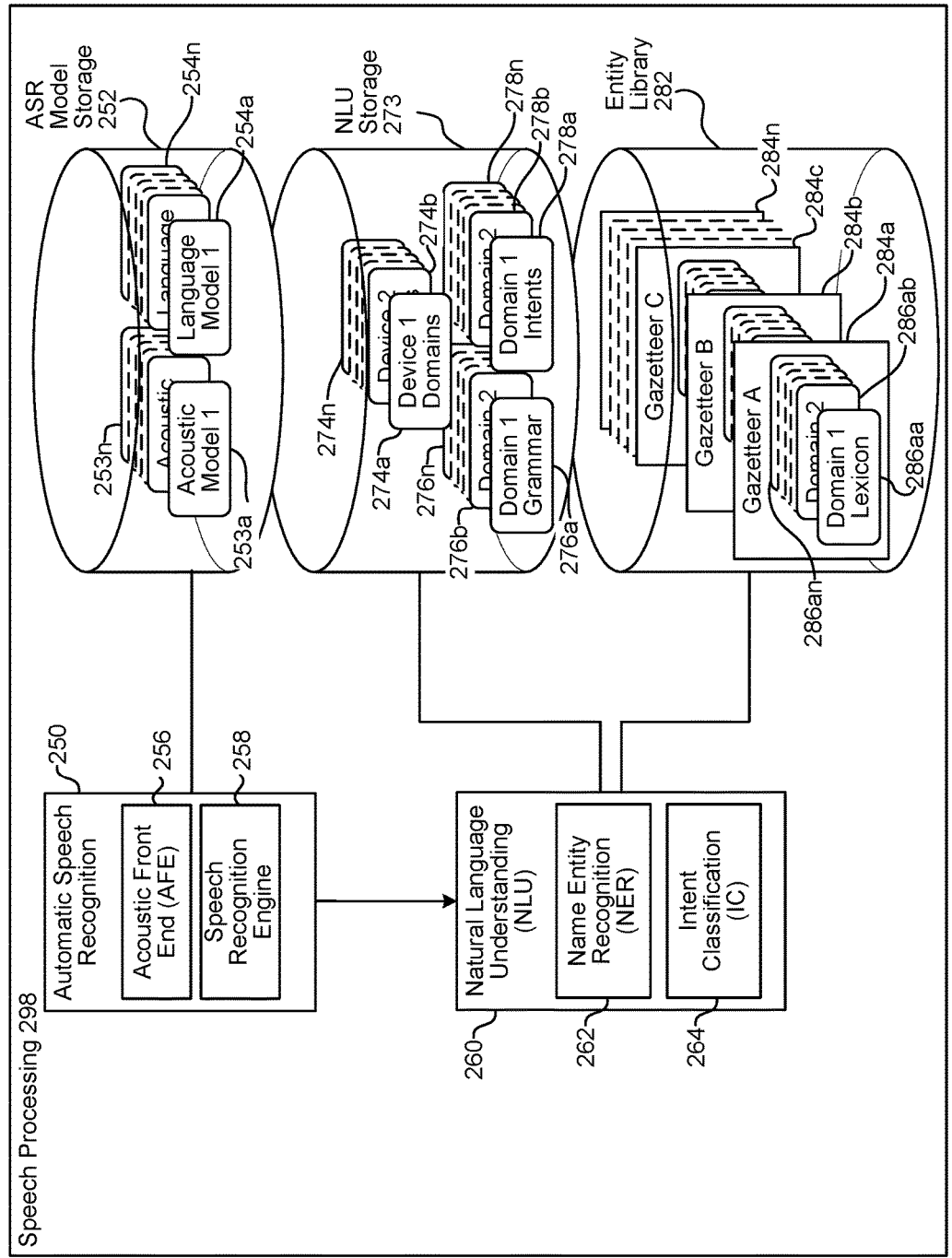
FIG. 2B is a diagram of components of a speech processing system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech processing system may be configured to execute one or more commands included in a spoken utterance. For example, the speech processing system may receive audio data corresponding to a spoken utterance, may process the audio data using ASR and NLU to determine a command invoked by the utterance, may obtain content responsive to the command, and may output the content to a user. If everything works well, the delivered content matches the user's intent and the user is pleased with the results. In some instances, however, the speech processing system may output content that is unresponsive to the command. This may happen for several reasons, including errors made in performing ASR and/or NLU. In other instances, the speech processing system may output content responsive to the command based on the speech processing system's intelligence, but which may be considered unresponsive because the content isn't what the user wanted. In these instances, and in other instances, a user may be interested in knowing how and/or why the speech processing system processed the input utterance to identify the content that was delivered.

The present disclosure solves the above (and other) problems by providing a contextual voice user interface that enables a user to query a speech processing system with respect to the decisions made to answer a previous spoken command. The speech processing system may store speech processing pipeline data used to process commands. At some point after the system outputs content deemed responsive to a particular command, a user may speak another command asking the system as to how it went about processing the particular previous command. For example, the user may speak one command and follow that command with a query of "why did you tell me that?" In response to the query (e.g., the second command), the speech processing system may access the stored speech processing pipeline data used to respond to the command, and may generate output data (which may be spoken back to the user, displayed on a screen, or output in some other manner) that describes the data and computing decisions involved in determining the content deemed responsive to the previous command. This way, the system can explain to a user how it processed the earlier command and the user can identify where the processing may have gone wrong so that the user can adjust the spoken commands (or the system operation if the user has access to do so) for future commands.

FIG. 1 shows a speech processing system 100 configured to provide a contextual voice user interface as described herein. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-detection devices 110 local to a user 5, as well as one or more networks 199 and one or more servers 120 connected to the speech-detection device(s) 110 across the network(s) 199. The server(s) 120 (which may be one or more different physical devices) may be capable of performing traditional speech processing (e.g., ASR, NLU, command processing, etc.) as well as other operations as described herein. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.). In addition, certain speech detection or command execution functions may be performed by the speech-detection device 110. Further, the system 100 may be in communication with external data sources, such as a knowledge base, external service provider devices (e.g., application servers 125), or the like.

As shown in FIG. 1, a speech-detection device 110 may capture audio 11 including a spoken utterance of a user 5 via a microphone or microphone array of the speech-detection device 110. The speech-detection device 110 determines audio data corresponding to the captured audio 11, and sends the audio data to the server(s) 120 for processing.

The server(s) 120 receives (130) the audio data from the speech-detection device 110. The server(s) 120 performs (132) ASR on the audio data to generate text data. The server(s) 120 also performs (134) NLU on the text data to generate NLU results. Rather than the server(s) 120 performing ASR on audio data to generate the text data, the server(s) 120 may receive the text data from a device. For example, a user may input (via a keyboard) text into a computing device. Text data corresponding to the text may then be sent to the server(s) 120. The server(s) 120 may then perform NLU on the text data to generate the NLU results.

The server(s) 120 may determine (136) the NLU results correspond to a request for details about a previous utterance's processing. For example, ASR results including text data corresponding to "why did you tell me that," "why did you tell me the weather for Seattle yesterday," etc. may be interpreted by an NLU component of the system 100 as corresponding to a request for details about a previous utterance's processing. Thus the NLU results may include data such as {intent: analyze previous utterance's processing} {subject utterance: [preceding utterance]}, {user ID: 1XBY54}. The server(s) 120 may also identify (138) a user that spoke the utterance represented in the audio data received from the speech-detection device 110, which may be output as part of the NLU results or from a user recognition component 295 discussed below. Knowing the user ID and that the utterance corresponds to a request for details about a previous utterance's processing, the server(s) 120 may determine (140) processing decisions performed with respect to the previous utterance. For example, if the NLU results include text data corresponding to "why did you tell me that," the server(s) 120 may determine "that" refers to an immediately preceding user interaction with the system 100. According to another example, if the NLU results include text data corresponding to "why did you tell me the weather for Seattle yesterday," the server(s) 120 may determine "weather" as being a domain, "Seattle" as being a resolved object, and "yesterday" as being a timestamp. Therefrom, the server(s) 120 may determine a previous user interaction processed "yesterday" and involving the weather domain with "Seattle" as a resolved object. It should be appreciated that the user's query with respect to knowing how and/or why a past command was processed is not limited to any particular temporal relationship. The temporal nature of the user's request may be limited by data retention policies of the system 100. For example, if the system 100 only retains speech processing pipeline data for 90 calendar days, the user may be limited to asking how a given command was processed to the preceding 90 calendar days.

The server(s) 120 may generate (142) output audio data representing the data and processing decisions involved in responding to the previous utterance. The server(s) 120 may send (144) the output audio data to the speech-detection device 110 (or another device indicated in a profile of the user 5), which in turn may output audio corresponding to the output audio data to the user 5.

The system 100 of FIG. 1 may operate using various speech processing components as described in FIGS. 2A and 2B. The various components illustrated may be located on a same or different physical devices. Communication between various components illustrated in FIGS. 2A and 2B may occur directly or across a network(s) 199. An audio capture component, such as a microphone (or array of microphones) of the speech-detection device 110 (or other device), captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120 for processing. The audio data 111 may be output from an acoustic front end (AFE) 256 located on the speech-detection device 110 prior to transmission, or the audio data 111 may be in a different form for processing by a remote AFE 256, such as the AFE 256 located with an ASR component 250 of the server(s) 120.

The wakeword detection component 220 works in conjunction with other components of the speech-detection device 110, for example a microphone to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

The speech-detection device 110 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the speech-detection device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in audio data.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, or semantic analysis. Instead, audio data is analyzed to determine if specific characteristics of the audio data match preconfigured acoustic waveforms, audio signatures, or other data to determine if the incoming audio data "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected in the audio data, the speech-detection device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the speech-detection device 110 prior to sending the audio data 111 to the server(s) 120.

Upon receipt by the server(s) 120, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., an ASR model storage 252). For example, the ASR component 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text data corresponding to the audio data 111. The ASR component 250 may also output multiple hypotheses in the form of a lattice or an N-best list with each hypothesis corresponding to a confidence score or other score (e.g., such as probability scores, etc.).

The server(s) 120 including the ASR component 250 may include an AFE 256 and a speech recognition engine 258. The AFE 256 transforms audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-detection device 110 may process audio data 111 into feature vectors (e.g., using an on-device AFE 256) and transmit the feature vector data to the server(s) 120, across the network(s) 199, for ASR processing. Feature vector data may arrive at the server(s) 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 258 to the orchestrator 297 or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 either directly or indirectly through the orchestrator component 297.

The device performing NLU processing (e.g., the server(s) 120) may include various components, including potentially dedicated processor(s), memory, storage, etc. The device performing NLU processing may include a dedicated NLU component 260, which may include a named entity recognition (NER) component 262 and an intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways. Domain, as used herein, may refer to a category of content, such as music, videos, weather, etc.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-detection device 110, the server(s) 120, an application server 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," the NLU component 260 may tag "call" as a command (e.g., to execute a phone call) and may tag "mom" as a specific entity and target of the command. In addition, the telephone number for the entity corresponding to "mom" stored in a contact list may be included in the annotated NLU results.

To correctly perform NLU processing of an utterance, the NLU component 260 may be configured to determine a "domain" of the utterance so as to determine and narrow down which services offered by an endpoint device (e.g., the server(s) 120, the speech-detection device 110, an application server(s) 125, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-detection device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance may be NLU processed using the grammar models and lexical information for communications, and may also be processed using the grammar models and lexical information for music. The responses to the spoken utterance produced by each set of models is scored, with the overall highest ranked result from all applied domains being ordinarily selected to be the correct result.

The IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazetteer for similarity with the framework slots. So a framework for a "play music" intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-detection device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may also be sent to a user recognition component 295 either directly or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 2 may also include a confidence component that determines an overall confidence as the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, etc., and output of the user recognition component 295 (e.g., a unique ID of a user) may be sent to a command processor 290, which may be located on a same or separate server 120 as part of the system 100.

The system 100 may include more than one command processor 290, and the command processor(s) 290 may be determined based on the NLU output. For example, if the NLU output includes a command to play music, the command processor 290 selected may correspond to a music playing application, such as one located on the speech-detection device 110 or in a music playing appliance. Many such command processors 290 may be available to the system 100 depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Output from the NLU component 260 (and optionally the user recognition component 295) may be sent to a command processor(s) 290/skill either directly or indirectly via the orchestrator component 297. A "skill" may correspond to a domain and may be software running on a server or device akin to an application. That is, a skill may enable a server(s) 120/125 to execute specific functionality in order to provide data or produce some other output called for by a user. The system may be configured with more than one skill. For example a weather service skill may enable the server(s) 120 to execute a command with respect to a weather service server 125, a car service skill may enable the server(s) 120 to execute a command with respect to a taxi service server 125, an order pizza skill may enable the server(s) 120 to execute a command with respect to a restaurant server 125, etc.

The server(s) 120 may include a communication manager command processor(s) 290. The communication manager command processor(s) 290 may be configured to perform various steps described herein with respect to message generation and transmission.

The NLU operations described herein may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the multi-domain architecture may consist of multiple domains for intents/commands executable by the system 100 (or by other devices connected to the system 100), such as music, video, books, and information. The NLU component 260 may include a plurality of domain recognizers 335, where each domain may include its own recognizer 263. Each recognizer 263 may include various NLU components such as an NER component 262, IC component 264, and other components such as an entity resolver, etc.

For example, a music domain recognizer 263-A may have an NER component 262-A that identifies what slots (i.e., portions of input text data) may correspond to particular words relevant to the music domain. The slots may correspond to entities such as (for the music domain) a performer, album name, song name, etc. An NER component 262 may use a machine learning model, such as a domain specific conditional random field (CRF) to both identify the portions of text data corresponding to an entity as well as identify what type of entity corresponds to the text portion. For example, for the text "play songs by the stones," an NER component 262-A trained for a music domain may recognize the portion of text "the stones" corresponds to an entity and an artist name. The music domain recognizer 263-A may also have its own IC component 264-A that determines the intent of the utterance represented in the text data, assuming that the text data is within the proscribed domain. An IC component 264 may use a model, such as a domain specific maximum entropy classifier to identify the intent of the utterance, where the intent is the action the user desires the system to perform.

As illustrated in FIG. 3, multiple domains may operate substantially in parallel, with different domain specific components. That is, domain B for video may have its own recognizer 263-B including NER component 262-B and IC component 264-B. Domain C for books may also have similar components in its recognizer 263-C, and so on for the different domains available to the system 100. When text data 300 (e.g., ASR output text data) is received, the same text data that is input into the NLU pipeline for domain A 263-A may also be input into the NLU pipeline for domain B 263-B, where the components for domain B 263-B will operate on the text data 300 as if the text data 300 related to domain B, the components for domain C 263-C will operate on the text data 300 as if the text data 300 related to domain C, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, etc.). The recognizers 335 may operate using machine learning trained models such as a CRF, maximum entropy classifier, neural network (such as a deep neural network (DNN) or recurrent neural network (RNN) or other classifier. The recognizers 335 may also use rules that operate on input text data in a particular form to identify named entities and/or intents. The recognizers 335 may also operate using a data structure such as a finite state transducer (FST) to process the text data 300 to perform NER and/or IC. Other techniques or models may also be used to perform NER and/or IC. The techniques may also be used together. For example, a set of rules, an FST, and a trained machine learning model may all operate on text data 300 substantially in parallel to determine the named entities/intents of an utterance represented in the text data 300. If one technique performs its task with high enough confidence, the system may use the output of that technique over the others. The system may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the utterance represented in the text data 300.

The output of each recognizer may be an N-best list of intents and slots representing the particular recognizer's top choices as to the meaning of the utterance represented in the text data 300, along with scores for each item in the N-best list. For example, for text data 300 of "tell me why you told me the weather for Seattle," the analysis domain recognizer 263-A may output an N-best list in the form of:

[0.95] DeterminePreviousProcessingIntent PreviousIntent: GetWeatherIntent Location: Seattle, Wash.

[0.02] DeterminePreviousProcessingIntent PreviousIntent: GetSongIntent ArtistName: Seattle

[0.01] DeterminePreviousProcessingIntent PreviousIntent: GetSongIntent AlbumName: Seattle

[0.01] DeterminePreviousProcessingIntent PreviousIntent: GetSongIntent SongName: Seattle where the NER component 262-A of recognizer 263-A has determined that for different items in the N-best list the word "Seattle" corresponds to a slot. (Though different items in the N-best list interpret those slots differently, for example labeling "Seattle" as a location in one choice, an artist name in another choice, an album name in another choice, and a song name in another choice.) The IC component 264-A of recognizer 263-A has also determined that the intent of the utterance represented in the text data 300 is a DeterminePreviousProcessingIntent (and selected that as the intent for each item on the analysis N-best list). The recognizer 263-A also determined a score for each item in the list representing the recognizer's confidence that the particular item is correct. As can be seen in the example, the top item has the highest score. Each recognizer of the recognizers 335 may operate on the text data 300 substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER (e.g., identify words of the input text data 300 that are important for downstream processing (sometimes called light slot filling), and may even label those words according to type (such as artist name, album name, city, or the like)), the recognizers 335 may not perform entity resolution (i.e., determining the actual entity corresponding to the words of the text data 300). Entity resolution is typically a higher latency process and involves communications with a knowledge base 272 or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 of all the domains may be passed to a cross domain processing component 355, which may then further rank the individual items in the N-best lists 340 as well as perform other operations.

The cross domain processing component 355 may include a cross-domain ranker 350. The cross-domain ranker 350 takes the N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example text data 300 of "play the hunger games." The text data 300 may be processed by each of the recognizers 335, and each will output an N-best list, resulting in the group of N-best lists 340 input into the cross domain processing component 355. The cross-domain ranker 350 may then rank the individual items among the N-best lists to create a new N-best list. For example, the cross-domain ranker 350 may output an N-best list in the form of:

[0.78] Analysis DeterminePreviousProcessingIntent PreviousIntent: GetWeatherIntent Location: Seattle, Wash.

[0.13] Video OutputVideoIntent VideoName: Seattle

[0.07] Music PlayMusicIntent AlbumName: Seattle where the top items from different N-best lists from multiple domains are grouped into a single N-best list 360. As shown, the top scoring item is from the analysis domain 263-A, includes the intent "determinepreviousprocessingintent," a slot labeled as previous intent corresponding to "getweather," and a slot labeled as location corresponding to the text "Seattle, Washington." The next item is from the video domain 263-B, includes the intent "outputvideointent" and a slot labeled as video name corresponding to the text "Seattle." Each item in the cross-domain N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler component 352 can take tex from slots and alter it to make the text more easily processed by downstream components. The operations of the light slot filler component 352 are typically low latency operations that do not involve heavy operations such as reference to a knowledge base. The purpose of the light slot filler component 352 is to replace words with other words or values that may be more easily understood by downstream components. For example, if the text data 300 included the word "tomorrow," the light slot filler component 352 may replace the word "tomorrow" with an actual date for purposes of downstream processing. Similarly, a word "CD" may be replaced by a word "album." The replaced words are then included in the cross domain N-best list 360.

The cross-domain N-best list 360 is then output to a heavy slot filler and entity resolver 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The entity resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user utterance). In the example "play songs by the stones," the entity resolver 370 may reference to a personal music catalog, Amazon Music account, user profile 504, or the like. The output from the entity resolver 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components or pipeline or may be on a separate device in communication with the system. While illustrated as a cross-domain resolver, multiple entity resolvers 370 may exist where a particular entity resolver 370 may be specific for one or more domains.

As can be appreciated, the entity resolver 370 may not necessarily be successful in resolving every entity and filling every slot. This may result in incomplete results in the combined N-best list. A final ranker 390 may consider such errors when determining how to rank the ultimate results for potential execution. For example, if an item of the cross-domain N-best list 360 comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 263, cross domain processing component 355, or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input utterance, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may include application rating or popularity data. For example, if one application has a particularly high rating, the final ranker 390 may increase the score of results associated with that particular application. The other data 391 may also include information about applications that have been specifically enabled by the user (as indicated in a user profile 504, discussed in reference to FIG. 5). NLU results from enabled applications may be scored higher than results from non-enabled applications. User history may also be considered, such as if the user regularly uses a particular supplemental application or does so at particular times of day. Date, time, location, weather, type of device 110, user ID, context, and other information may also be considered. For example, the final ranker 390 may consider when any particular applications are currently active (such as music being played, a game being played, etc.). The highest scoring result (or results in the case of multiple commands being in an utterance) may be passed to a downstream command processor 290 for execution.

Following final ranking, the NLU component 260 may output NLU output data 385. The NLU output data 385 may include an indicator of the intent of the utterance along with data associated with the intent, for example an indication that the intent is "play music" and the music to be played is "Adele." The NLU output data 385 may be in the form of previous NLU data such as an item(s) in the N-best lists 340, an item(s) in the cross-domain N-best list 360, or the like. The NLU output data 385 may also be in a format executable by the command processor 290. Multiple instances of NLU output data (e.g., 385a-385n) may also be output.

Once the server(s) 120 determines what the top ranked command is based on the NLU output data 385, the server(s) 120 determines the command processor 290 to send the NLU output data 385 to. The command processor 290 then executes the command to generate output data. If the data output by the command processor 290 is text data that needs to be converted to speech, the text data is sent to a TTS component 414. In addition or alternatively to the text data output by the command processor 290 being sent to the TTS component 414, the text data may be inserted into an email, text message, or card for display to a user.

FIG. 4 illustrates the components of the system 100 used to convert text data into output audio data including speech. The TTS component 414 may receive text data (from the command processor 290, application server(s) 125, or other component) so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in a TTS storage 420 for converting the input text data into speech (i.e., audio data). The TTSFE 416 and the speech synthesis engine 418 may include their own controller(s)/processor(s) and memory, or they may use the controller/processor and memory of the server(s) 120, the speech-detection device 110, or another device, for example. Similarly, the instructions for operating the TTSFE 416 and the speech synthesis engine 418 may be located within the TTS component 414, within the memory and/or storage of the server(s) 120, the speech-detection device 110, or within an external device.

Text data input into the TTS component 414 may be sent to the TTSFE 416 for processing. The TTSFE 416 may include modules for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus. The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. The larger the unit database of the voice corpus, the more likely the system 100 will be able to construct natural sounding speech.

In another method of synthesis called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoder, code-excited linear prediction (CELP) vocoder, GlottHMM vocoder, harmonic/stochastic model (HSM) vocoder, or others.

For example, to create the customized speech output of the system 100, the system 100 may be configured with multiple voice inventories 478 (stored in TTS voice unit storage 472), where each unit database is configured with a different "voice." Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses, a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner, a traditional TTS output may be altered to take on the desired speech quality.

During runtime, the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
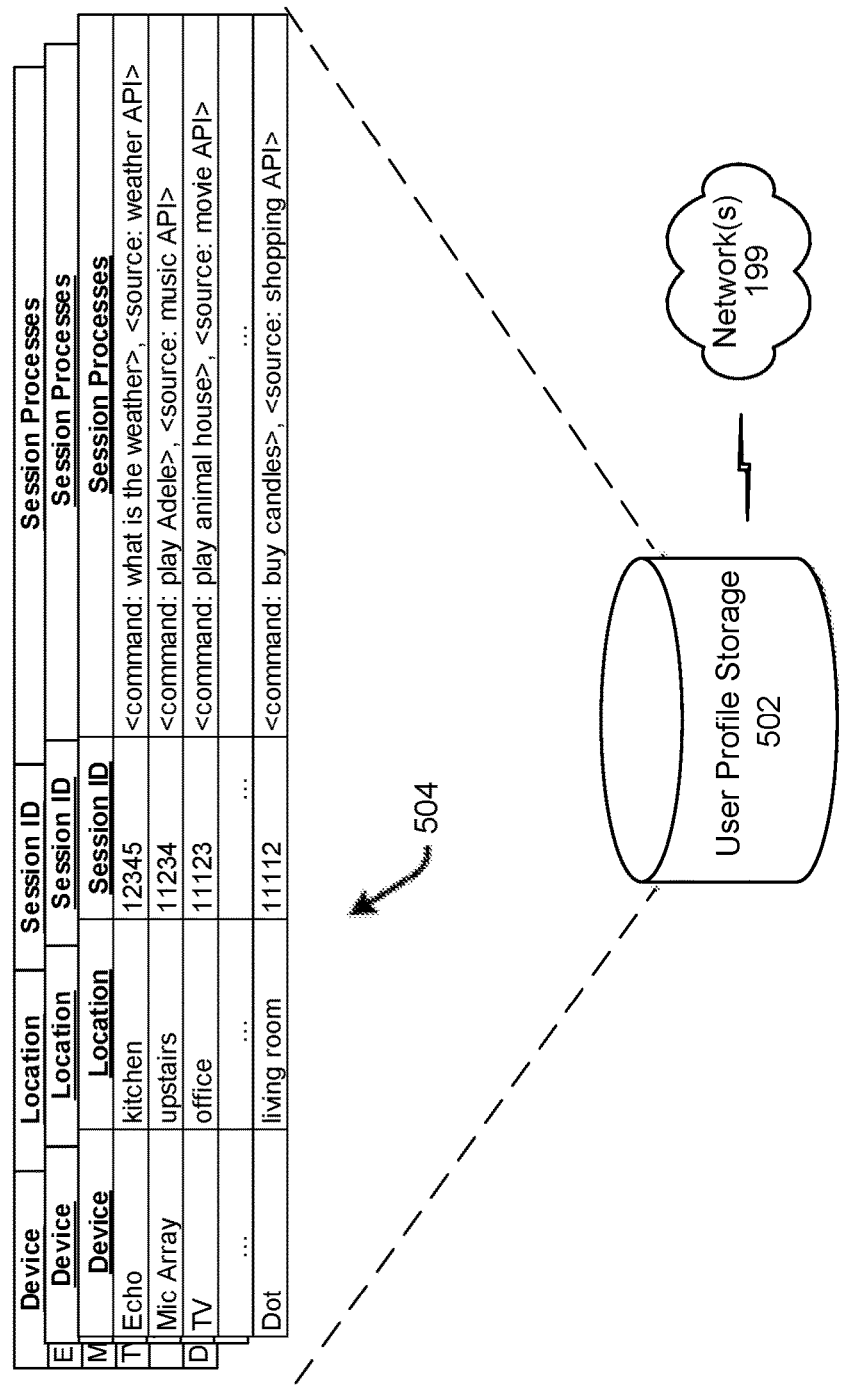
FIG. 5 illustrates data stored and associated with user profiles according to embodiments of the present disclosure.

FIG. 5 illustrates a user profile storage 502 that includes data regarding user accounts 504. The user profile storage 502 may be located proximate to the server(s) 120, or may otherwise be in communication with various components, for example over the network(s) 199. The user profile storage 502 may include a variety of information related to individual users, accounts, etc. that interact with the system 100. For illustration, as shown in FIG. 5, the user profile storage 502 may include data regarding the devices associated with particular individual user accounts 504. In an example, the user profile storage 502 is a cloud-based storage. Each user profile 504 may include data such as type of device data and location of device data for different devices. Each user profile 504 may also include session ID data associated with respect session processing data. The session processing data may include the determined commands of utterances, the determined sources from which to receive content for each utterance, and data indicating the success and/or failures for each utterance (e.g., the correctness of the data output for each utterance), for example. In addition, each user profile 504 may include user settings, preferences, permissions, etc. with respect to certain domains. Each user profile 504 may additionally include user affinity data, such as occupation of the user, hobbies of the user, etc.

FIG. 6 illustrates speech processing pipeline data that may be associated with given session ID data within a user profile 504. A session ID may be used to keep track of speech processing operations with respect to a single spoken utterance (e.g., a single portion of audio data received from the speech-detection device 110). Each session ID 602 may be associated with the text data 604 output with by the ASR component 250, intent data 606 output by the NLU component 260, populated slot data of an NLU output data framework 608 output by the NLU component 260, as well as API data 610 indicating the API invoked for the given session. Each portion of API data 610 may be associated with a particular domain. For example, a weather service API may be associated with a weather domain, a music service API may be associated with a music domain, a movie service API may be associated with a movie domain, an electronical marketplace API may be associated with a shopping domain, etc. Each session ID 602 may also be associated with context data 612. The type and amount of context data may be unique to each session ID. A session ID may be associated with location data indicating a geographic location of the speech-detection device 110. A session ID may also be associated with timestamp data indicating a time when either the speech-detection device 110 detected the utterance or the server(s) 120 received the audio data from the speech-detection device 110. A session ID may further be associated with a user ID indicating the user that spoke the utterance. Other context data is also possible. In addition to being stored in a user profile 504, the data represented in FIG. 6 may be sent to a separate storage for a user, such as an operations log accessible by an application developer.

The usefulness of data associated with each session ID may decay (i.e., become less useful over time). For example, the more time involved between the speaking of two utterances, the less important the context information associated with the first spoken utterance may become. After a threshold amount of time, context data may be deleted from the storage, thereby making space in the storage available for more contemporaneous context data.

FIGS. 7A through 7D illustrate the processing of a spoken utterance and the generation of a session record (e.g., the association of a session ID with speech processing data). A speech-detection device 110 receives (702) audio corresponding to a spoken utterance. The speech-detection device 110 generates audio data corresponding to the audio, and sends (704) the audio data to a server(s) 120 for further processing.

The server(s) 120 generates (706) a session identifier (or session ID) unique to processing of the spoken utterance represented in the audio data. The server(s) 120 may perform (708) ASR on the audio data to generate text data. The server(s) 120 may also identify (710) a user that spoke the utterance represented in the audio data, and may associate (712) the text data with the session ID in a profile of the identified user.

The server(s) 120 may perform (714) NLU on the text data to determine intent data representing an intent of the utterance (i.e., representing an action the user desires the system 100 to perform). The server(s) 120 may associate (716) the intent data with the session ID in the profile of the user.

The server(s) 120 may determine (718) a NLU format associated with the intent indicated in the intent data. The NLU format may provide a framework to organize NLU data. The NLU format may, for example, include one or more templates or other structures with which to store data where the format may have a particular syntax and can be used to generate data for the customer or for downstream (e.g., TTS) processing. The NLU format may include slots corresponding to entities associated with a given domain. The server(s) 120 may associate (720) portions of the text data with slots of the NLU format as described in detail herein with respect to FIGS. 2 and 3. The server(s) 120 may also associate (722) the associated text data and slots with the session ID in the profile of the user.

The server(s) 120 may determine (724) an application associated with the intent. That is, the server(s) 120 may determine an application from which to obtain content responsive to the spoken utterance. The application may be a first party (1P) application (such as one controlled or managed by the server(s) 120) as well as third party (3P) application (such as one managed by an application server(s) 125 in communication with the server(s) 120 but not controlled or managed by the server(s) 120). The server(s) 120 may also determine (726) an application program interface (API) associated with the application (i.e., via which the server(s) 120 may send a request for content to and receive corresponding content from the application server(s) 125). The server(s) 120 may associate (728) the data indicating the application and API with the session ID in the profile of the user.

As detailed above, the server(s) 120 may iteratively associate speech processing and command execution data with the session ID. Alternatively, it should be appreciated that the server(s) 120 may associate all speech processing and command execution data with the session ID at once. That is, after determine the API, the server(s) 120 may associate (730), in a single instance, the text data, the intent data, the associated text data and slots, the data indicating the application, and the data indicating the API with the session ID in the profile of the user.

Moreover, as detailed above, the server(s) 120 may associate the session ID with various data in the profile of the user. It should be appreciated that the server(s) 120 may associated the session ID with various data in storage other than the profile of the user. For example, such associated data may be stored in a system processing history storage, or the like.

After determine the API associated with the application, the server(s) 120 may send (732), via the API to an application server(s) 125, a signal requesting content responsive to the utterance (e.g., responsive to the intent and tagged text data output by the NLU component 260). The server(s) 120 receives (734), via the API from the application server(s) 125, content data.

If the content data is received as text data, the server(s) 120 may perform (736) on the content text data to generate output audio data. The server(s) 120 may send (738) the output audio data (either as received from the application server(s) 125 or generated using TTS processing) to the speech-detection device 110 (or other device indicated in the profile of the user). The speech-detection device 110 (or other device) outputs (740) audio corresponding to the output audio data. In certain instances, the content data received by the server(s) 120 from the application server 125 may include a link that may be sent from the server(s) 120 to the speech-detection device 110 so that the speech-detection device 110 may use the link to access the content from the application server(s) 125. In this case, the content may be sent from the application server(s) 125 through the server(s) 120 to the speech-detection device 110 or directly from the application server(s) 125 to the speech-detection device 110.

According to the present disclosure, a user may inquire as to why the system 100 (namely the speech-detection device 110) output previous content. In some situations, the user may inquire as to why certain content was output in response to the user's last spoken utterance. For example, the user may say "what is the weather." In response thereto, the system 100 (namely the speech-detection device 110) may output temperature data such as "today it will be a high of 70 degrees and a low of 50 degrees. Sometime thereafter, but without any intervening processing of the user's utterances, the user may state "why did you say that?" In other situations, the user may inquire as to why certain content was output in response to a previous (but not the last spoken) utterance of the user. For example, the user may say "why did you output the weather for Seattle yesterday?" FIGS. 8A through 8C illustrate the processing performed by the system 100 in response to a user inquiring with respect to the processing of a previous utterance.

A speech-detection device 110 receives (702) audio corresponding to a spoken utterance. The speech-detection device 110 generates audio data corresponding to the audio, and sends (704) the audio data to a server(s) 120 for further processing.

The server(s) 120 performs (708) ASR on the audio data to generate text data. The server may perform (802) NLU on the text data to determine an intent to explain why content with respect to the user's last spoken utterance was output. The server(s) 120 may alternatively perform (803) NLU on the text data to determine an intent to explain why specific content was provided in response to a specific utterance.

The server(s) 120 identifies (710) a user that spoke the utterance. The server(s) 120 also determines (804) session ID data associated with the previous utterance. If NLU processing determines the intent requests an explanation with respect to the user's last spoken utterance, the server(s) 120 may analyze timestamp data indicating when each respective session ID of the user was generated. That is, each portion of session ID data representing a different session ID may be associated with timestamp data indicating when the session ID was generated. If, on the other hand, NLU processing determines the intent requests an explanation with respect to a specific utterance (i.e., one that was not the last spoken utterance of the user), the server(s) 120 may determine, in the user's interaction history with the system, data most similarly matching the user's request. For example, if the user request corresponds to "why did you output the weather for Seattle yesterday," the server(s) 120 may access the user's history (e.g., may access system processing records associated with the user's unique user ID), and therein determine content associated with a timestamp of "yesterday" and including information specific to weather and Seattle. The server(s) 120 may then determine session ID data representing a session ID associated with the processing performed with respect to the determine user history data. The session ID data may be stored in a profile associated with the user, or other storage.

The server(s) 120 may determine (806) an output data format associated with the intent to explain why content was output. The output data format may include a template that can be used to generate data for TTS processing. The server(s) 120 may also determine (808) a first slot of the output data format is to be populated with ASR text data. The server(s) 120 may determine (810) ASR output text data associated with the session ID data, and populate (812) the first slot of the output data format with the ASR output text data. The ASR output text data may be stored in a profile associated with the user, or other storage.

The server(s) 120 may also determine (814) a second slot of the output data format is to be populated with intent data. The server(s) 120 may determine (816) intent data associated with the session ID data (i.e., data indicating an intent determined with respect to the utterance processed with respect to the session ID indicated in the session ID data), and populate (818) the second slot of the output data format with the intent data. The intent data may be stored in a profile associated with the user, or other storage.

The server(s) 120 may additionally determine (820) a third slot of the output data format is to be populated with application data. The server(s) 120 may determine (822) application data associated with the session ID data (i.e., data indicating an application determined to have content responsive to the utterance processed with respect to the session ID indicated in the session ID data), and populate (824) the third slot of the output data format with the application data. The application data may be stored in a profile associated with the user, or other storage.

The server(s) 120 performs (826) TTS on text data corresponding to the populated output data format to generate output audio data. In the example where the previous utterance corresponds to "what is the weather," the ASR output text data may correspond to "what is the weather," the intent data may correspond to "get weather," and the application data may correspond to "weather service." According to an example, output audio data generated using the aforementioned data may correspond to "I output the weather because you said what is the weather and I interpreted what is the weather as an intent to obtain weather information. I retrieved the weather information from weather service."

The server(s) 120 sends (738) the output audio data to the speech-detection device 110 (or another device indicated in the user's profile), which in turn outputs (740) audio corresponding to the output audio data.

FIG. 9 illustrates an example of an output data format that may be used when the spoken utterance requesting to know why content was output originates for a user. As illustrated, the output data format may include a slot corresponding to the content previously output, a slot corresponding to ASR output text data, slots corresponding to portions of the ASR output text data as well as corresponding slots for NLU interpretations of the ASR output text data portions. The output data format may further include a slot indicating the application from which the content was received. Other slots are possible.

A user may have the option to instruct the system to perform processing with respect to an utterance in a certain manner in the future based on the user receiving the processing performed with respect to the utterance in the past. Once data is output to the user using the output data format associated with a user, the user may speak various further utterances to the system that request the system perform certain processes. In an example, the user may speak an utterance to the system requesting the system determine a new content source for the utterance. The system may determine such an utterance corresponds to a "DiscoverNewMediaSourceIntent" and perform associated processing. In another example, the user may speak an utterance to the system requesting the system create a new subscription with respect to the newly determined content source. The system may determine such an utterance corresponds to a "CreateNewMediaSubscriptionIntent" and perform associated processing. Prior to allowing a user to further inquire the system, the system may authenticate and verify the user as being the user that spoke the previous utterance. Authentication and verification may be performed by the user recognition component 295.

A different output data format from that which is sent to a user may be used when the spoken utterance requesting to know why content was output originates from an application developer. An application developer is a user having different permissions than traditional users of the system 100. For example, an application developer may have the ability to change how a given command processor 290 processes utterances. An application developer may also debug any issues present in a command processor's logic. The slots and structure of the output data format used to convey content to a user may be different from the slots and structure of the output data format used to convey content to an application developer. Moreover, it should be appreciated that the slots and structure of an output data format used to convey content to one application developer may be different from the slots and structure of an output data format sued to convey content to another application developer.

An application developer user may have the option to further engage the system with respect to processing performed regarding a previous utterance. Once data is output to the application developer user using the output data format associated with an application developer, the user may speak various further utterances to the system that request the system perform certain processes. In an example, the application developer may speak an utterance to the system requesting the system check the status of a database. The system may determine such an utterance corresponds to a "checkdatabasestatusintent" and perform associated processing. In another example, the application developer may speak an utterance to the system requesting the system check an availability of a service. The system may determine such an utterance corresponds to a "checkserviceavailabilityintent" and perform associated processing. In yet another example, the application developer may ask about other ASR outputs that were generated for the previous utterance, other NLU intents that were determined for the previous utterance, etc. Prior to allowing an application user to further inquire the system, the system may authenticate and verify the user as being the user that spoke the previous utterance. Authentication and verification may be performed by the user recognition component 295.

Figure 10:
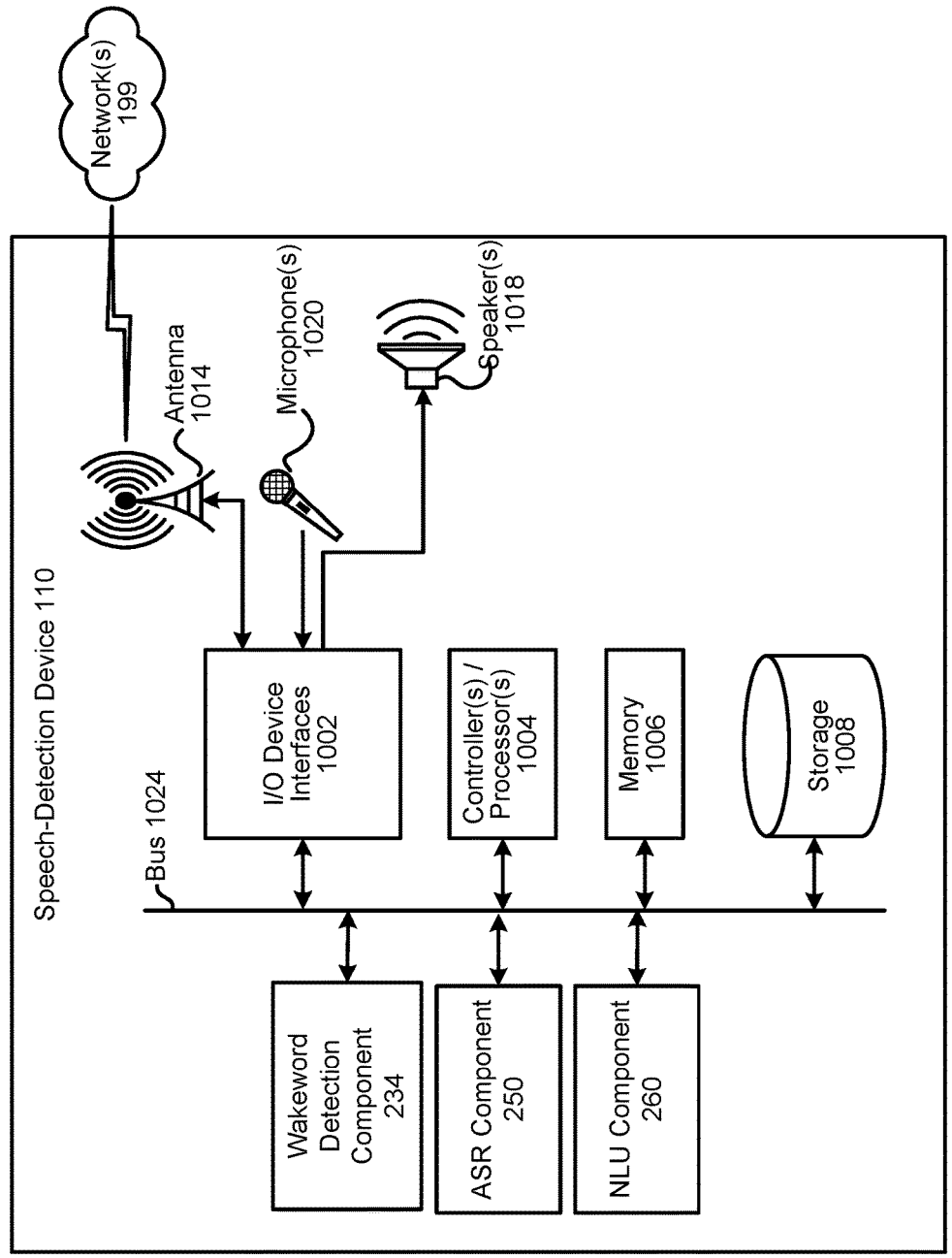
FIG. 10 is a block diagram conceptually illustrating example components of a speech-detection device according to embodiments of the present disclosure.
Figure 11:
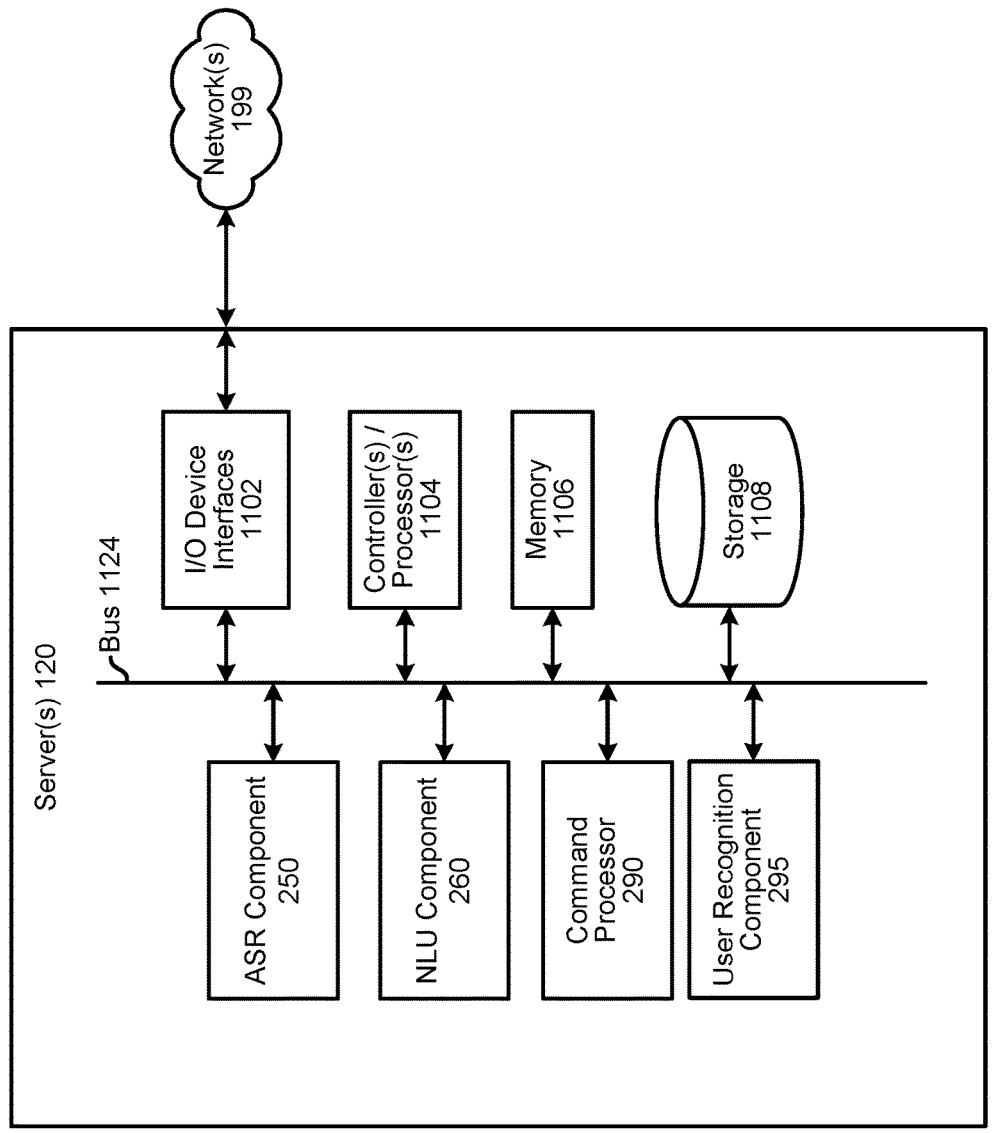
FIG. 11 is a block diagram conceptually illustrating example components of a server according to embodiments of the present disclosure.

FIG. 10 is a block diagram conceptually illustrating a user device that may be used with the described system. FIG. 11 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storagee, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker(s) 1018, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. The microphone(s) 1020 may be configured to capture audio. If an array of microphones 1020 is included, approximate distance to a sound's point of origin may be determined by acoustic localization based on time and amplitude differences between sounds captured by different microphones of the array.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

The device 110 and/or the server(s) 120 may include the ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server(s) 120 may include the NLU component 260. The NLU component 260 in the device 110 may be of limited or extended capabilities. The NLU component 260 may comprise the NER component 262, the IC component 264, and/or other components. The NLU component 260 may also include a stored knowledge base and/or entity library, or those storages may be separately located.

The device 110 may further include the wakeword detection component 234 as described herein.

The server(s) 120 may include the command processor 290 configured to execute commands/functions associated with a spoken utterance as described herein.

The server(s) 120 may further include the user recognition component 295 as described herein.

As noted above, multiple devices may be employed in a single speech processing system 100. In such a multi-device system, each of the devices may include different components for performing different aspects of the speech processing. The multiple devices may include overlapping components. The components of the device 110 and the server(s) 120, as illustrated in FIGS. 10 and 11, are exemplary, and may be located as a stand-alone device or may be included, in whole or in part, as a component of a larger device or system.

Figure 12:
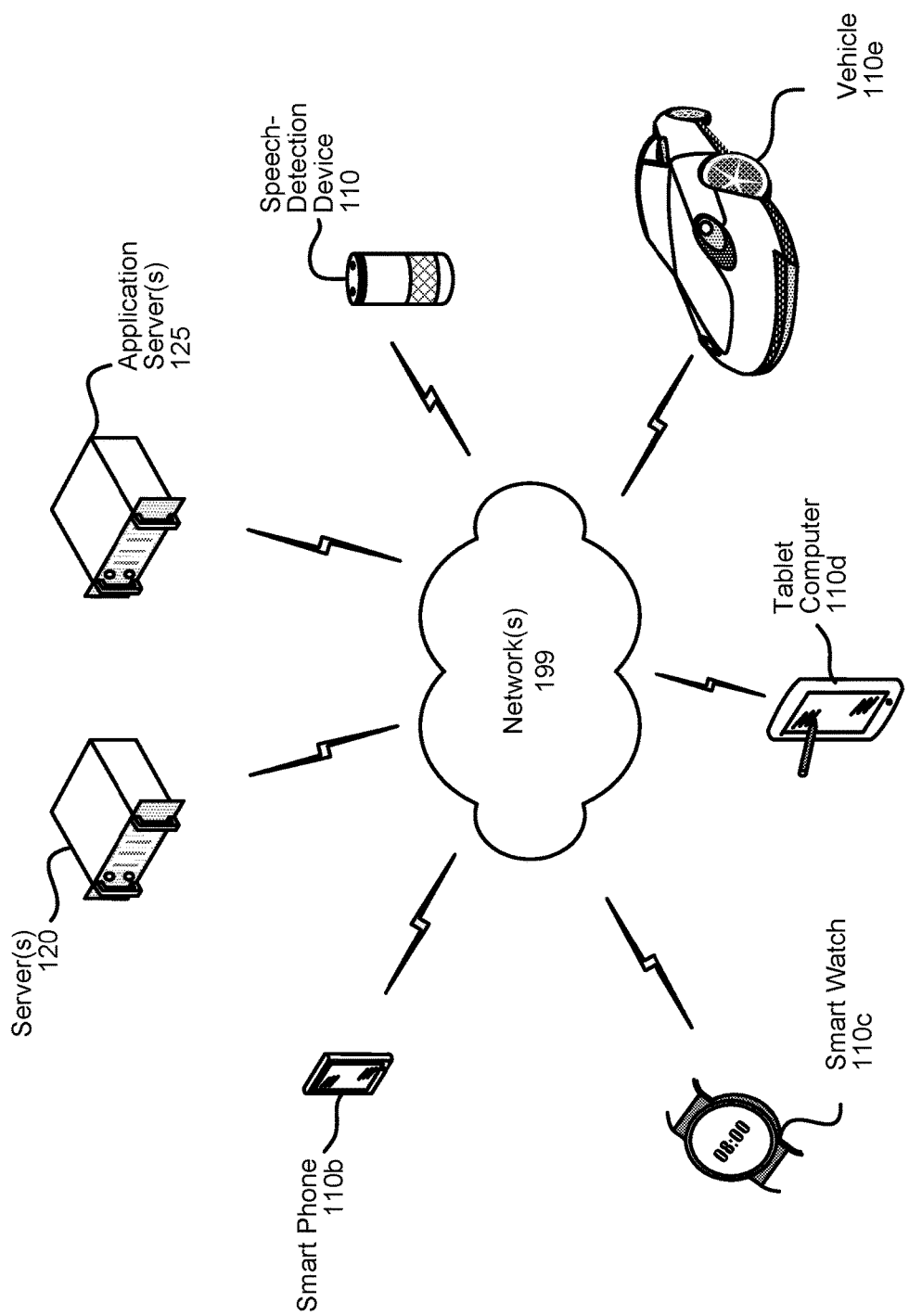
FIG. 12 illustrates an example of a computer network for use with the speech processing system.

As illustrated in FIG. 12, multiple devices (110, 110b-110e, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-detection device 110, a smart phone 110b, a smart watch 110c, a tablet computer 110d, and/or a vehicle 110e may be connected to the network(s) 199 through a wireless service provider, over a WiFi or cellular network connection, or the like. Other devices are included as network-connected support devices, such as the server(s) 120, application developer devices (e.g., the application server(s) 125), or others. The support devices may connect to the network(s) 199 through a wired connection or wireless connection. Networked devices may capture audio using one-or-more built-in or connected microphones or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising: during a first time period at one or more remote devices:
   receiving, from a device, first input audio data corresponding to a first utterance;
   generating an identifier;
   associating the identifier with the first utterance;
   performing speech recognition processing on the first input audio data to generate first text data;
   associating the first text data with the identifier;
   performing natural language processing on the first text data to determine a first intent corresponding to the first utterance;
   associating the first intent with the identifier;
   performing natural language processing on the first text data to determine at least a portion of the first text data that potentially corresponds to an entity;
   associating, with the identifier, the at least a portion of the first text data and an indication of the entity;
   determining an application associated with the first intent;
   associating application data representing the application with the identifier;
   sending, to a remote device associated with the application, a signal requesting content responsive to the first utterance;
   receiving, from the remote device, content data representing the content; and
   causing the device to emit the content data; and
   during a second time period subsequent to the first time period at the one or more remote devices:
   receiving, from the device, second input audio data corresponding to a second utterance;
   performing speech recognition processing on the second input audio data to generate second text data;
   performing natural language processing on the second text data to determine a second intent corresponding to the second utterance, the second intent being to determine an explanation for processing of the first utterance and to receive previous speech processing results corresponding to the first utterance;
   determining the identifier associated with the first utterance;
   determining, based on the identifier, at least one of the first text data, the first intent, the at least a portion of the first text data, the indication of the entity, or the application data;
   determining an output data format associated with the second intent;
   generating output data using the output data format, wherein the output data includes the first text data and at least one of the first intent, the indication of the entity, or the application data with at least a first portion of the output data format; and
   sending the output data to the device.

2. The computer-implemented method of claim 1, further comprising:
   receiving, from the device, third input audio data corresponding to a third utterance;
   performing speech recognition processing on the third input audio data to generate third text data;
   performing natural language processing on the third text data to determine a third intent corresponding to the third utterance, the third intent being to receive speech processing results corresponding to a fourth utterance;
   determining a second identifier associated with the fourth utterance;
   determining speech processing data associated with the second identifier;
   determining the output data format is associated with the third intent;
   generating second output data using the output data format, wherein the second output data includes at least a portion of the speech processing data; and
   sending the second output data to the device.

3. The computer-implemented method of claim 2, further comprising:
   determining the third text data includes an indication of a time period when the fourth utterance was spoken;
   determining, in a profile associated with the third utterance, the time period; and
   determining the second identifier is associated with the time period in the profile.

4. A system comprising:
   at least one processor; and
   at least one memory including instructions that, when executed by the at least one processor, cause the system to:
   perform natural language processing on input text data representative of input from a user device to determine an intent of a current user input;
   determine the intent is to receive an explanation of a previous output corresponding to a previous user input and receive previous speech processing results corresponding to the previous user input;
   determine an identifier associated with the previous user input;

determine previous speech recognition results associated with the identifier;
determine previous natural language processing results associated with the identifier;
determine an output format associated with the intent;
generate output data using the output format, wherein the output data includes a portion of the input text data and at least one of: at least a portion of the previous speech recognition results or at least a portion of the previous natural language processing results; and
send the output data to a first device associated with the input text data.

5. The system of claim 4, wherein:
the previous speech recognition results include text data output based on the previous user input, and
the previous natural language processing results include at least one of a previous intent determined based on processing of the previous user input, or application data representing an application associated with the previous intent.

6. The system of claim 4, wherein the instructions, when executed by the at least one processor, further cause the system to:
receive input audio data corresponding to the previous user input;
generate the identifier;
perform speech recognition processing on the input audio data to generate second input text data;
associate the second input text data with the identifier;
perform natural language processing on the second input text data to determine a previous intent;
associate the previous intent with the identifier;
determine an application associated with the previous intent;
associate application data representing the application with the identifier;
send, to a remote device associated with the application, a signal requesting content responsive to the previous user input;
receive, from the remote device, content data representing the content; and
cause the first device to emit the content data.

7. The system of claim 6, wherein the instructions, when executed by the at least one processor, further cause the system to:
associate, after determining the application, the second input text data with the identifier and the previous intent with the identifier.

8. The system of claim 4, wherein the previous user input is a previously spoken utterance.

9. The system of claim 4, wherein the instructions, when executed by the at least one processor, further cause the system to:
determine context data representing at least one of a geographic location of a user or a timestamp corresponding to when audio corresponding to the previous user input was received; and
associate the context data with the identifier,
wherein the output data further includes at least a portion of the context data.

10. The system of claim 4, wherein the instructions, when executed by the at least one processor, further cause the system to:
determine a user corresponding to the input text data is an application developer; and
determine, based on the user being an application developer, a second output format.

11. The system of claim 4, wherein the instructions, when executed by the at least one processor, further cause the system to:
receive input audio data corresponding to a second utterance;
perform speech processing on the input audio data to determine a second intent to determine a new content source for the previous user input; and
associate the previous user input with the new content source.

12. The system of claim 4, wherein the instructions, when executed by the at least one processor, further cause the system to:
determine the previous user input was received at a first time;
determine the first time is within a threshold amount of time to a current time; and
determine, based on the first time being within the threshold amount of time, the identifier.

13. A computer-implemented method comprising:
performing natural language processing on input text data representative of input from a user device to determine an intent of a current user input;
determining the intent is to receive an explanation of a previous output corresponding to a previous user input and receive previous speech processing results corresponding to the previous user input;
determining an identifier associated with the previous user input;
determining previous speech recognition results associated with the identifier;
determining previous natural language processing results associated with the identifier;
determining an output format associated with the intent;
generating output data using the output format, wherein the output data includes a portion of the input text data and at least one of: at least a portion of the previous speech recognition results or at least a portion of the previous natural language processing results; and
sending the output data to a first device associated with the input text data.

14. The computer-implemented method of claim 13, wherein:
the previous speech recognition results include text data output based on the previous user input, and
the previous natural language processing results include at least one of a previous intent determined based on processing of the previous user input, or application data representing an application associated with the previous intent.

15. The computer-implemented method of claim 13, further comprising:
receiving input audio data corresponding to the previous user input;
generating the identifier;
performing speech recognition processing on the input audio data to generate second input text data;
associating the second input text data with the identifier;
performing natural language processing on the second input text data to determine a previous intent;
associating the previous intent with the identifier;
determining an application associated with the previous intent;
associating application data representing the application with the identifier;

sending, to a remote device associated with the application, a signal requesting content responsive to the previous user input;

receiving, from the remote device, content data representing the content; and causing the first device to emit the content data.

16. The computer-implemented method of claim 15, further comprising:

associating, after determining the application, the second input text data with the identifier and the previous intent with the identifier.

17. The computer-implemented method of claim 13, wherein the previous user input is a previously spoken utterance.

18. The computer-implemented method of claim 13, further comprising:

determining context data representing at least one of a geographic location of user or a timestamp corresponding to when audio corresponding to the previous user input was received; and associating the context data with the identifier, wherein the output data further includes at least a portion of the context data.

19. The computer-implemented method of claim 13, further comprising:

determining a user corresponding to the input text data is an application developer; and determining, based on the user being an application developer, a second output format.

20. The computer-implemented method of claim 13, further comprising:

receiving second input audio data corresponding to a second utterance;

performing speech processing on the second input audio data to determine a second intent to determine a new content source for the previous user input; and associating the previous user input with the new content source.

* * * * *